April 6, 1948.　　　F. S. STERNAD　　　2,439,064
TOOL FOR MANIPULATING RUBBER
Filed Jan. 10, 1945

Inventor
Frank S. Sternad
By
Atty

Patented Apr. 6, 1948

2,439,064

UNITED STATES PATENT OFFICE 2,439,064

TOOL FOR MANIPULATING RUBBER

Frank S. Sternad, Cuyahoga Falls, Ohio, assignor to The B. F. Goodrich Company, New York, N. Y., a corporation of New York Application January 10, 1945, Serial No. 572,161

7 Claims. (Cl. 154—9)

This invention relates to tools and is especially useful in the working of rubber or other rubber-like materials as in the building of tires and other articles of unvulcanized sheet material or fabric coated with such materials.

In the manufacture of tires and other articles by assembly of unvulcanized sheets or strips of rubber composition and fabric coated therewith about a rotating former, handled rollers and hand swabs have been used to form and smooth the material to the desired shape. Such tools as have been proposed have been hard to hold and difficult to manipulate. It has been found that the application of solvents to the surface of the rubber-like material acts upon the material to make it more adhesive by freshening the surface and washing deposited dust therefrom and that when first applied acts as a lubricant enabling the applicator to slide freely along the surface, later by absorption and evaporation providing a tacky or adhesive surface.

Objects of the invention are to provide a tool adapted for easy manipulation of the material, to provide for wetting the surface with solvent and simultaneously rolling and smoothing the surface while the solvent is being absorbed and evaporated, to provide for convenient holding of the composite tool, to provide for convenient smoothing and rolling the sheet material about a marginal shoulder, and to provide traction of the roller.

These and other objects will appear from the accompanying drawings and the following description.

Figure 1:
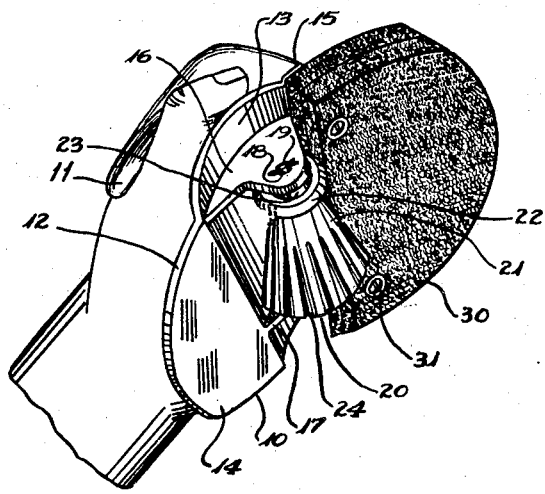
Fig. 1 is a perspective view of a tool constructed in accordance with and embodying the invention showing the working face of the tool, the tool being held in the hand of an operator.

Referring to the drawings, the numeral 10 designates a plate or support of light weight material, preferably of an aluminum alloy shaped to conform to the palm of a hand and having an integral rib 11 formed with concave sides adapted to fit between the thumb and forefinger of the hand and to be grasped thereby while the fingers rest against the plate. The plate is generally of convex form on the supporting face 12 to fit the palm of the hand and has a central concavity 13 on its tool supporting face separating relatively flat end portions 14, 15. In the concave portion 13 a pair of parallel upstanding ears 16, 17 are provided and these are apertured in alignment, as at 18, to receive and retain a shaft 19.

Rotatably mounted about the shaft is a roller 20 having a frustro-conical portion 21 having an inclined angle of substantially 30° and at the small end thereof is an outwardly directed flange 22 having a rounded edge. The roller is mounted about the shaft on ball bearings 23 for free movement thereabout. To provide for positively rotating the roller axially disposed grooves 24 are formed in the surface of the conical portion thereof.

To provide for disposition of the roller such that the roller will be applied most naturally to the material in a manner to provide an inclination of the flange 22 thereof with relation to the margin of the material and thereby to avoid grabbing of the tool and the material and also to provide an advantageous wiping action of the flange against the material at the margin and lateral creep of the roller, the ear 16 is nearer the ends of the operator's fingers than the ear 17 substantially by an amount sufficient to incline the shaft 19 to the longitudinal axis of the support at an obtuse angle, and preferably by an amount equal to half of the included angle of the conical portion of the roller 20 whereby the face of the core nearest the tips of the operator's fingers will be parallel to the axis of the work supporting drum. The axis of the roller is located in a plane substantially parallel to the support.

To provide for moistening the surface to which the roller is to be applied, an absorbent pad 30 of felt or similar material may be removeably secured to the flat portion 15 of the plate, as by screws 31. The pad extends beyond the plate 10 and is flexible so that it may be pressed toward the work by the ends of the fingers which rest upon it.

Figure 3:
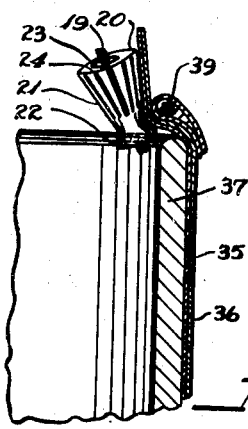
Fig. 3 is a cross-sectional view of the drum and partially constructed tire taken on line 3—3 of Fig. 2 showing in full lines at one side of the drum the final position of the roller and plies and at the opposite side an earlier position thereof in turning the margins of under-bead plies about the bead cores.
Figure 2:
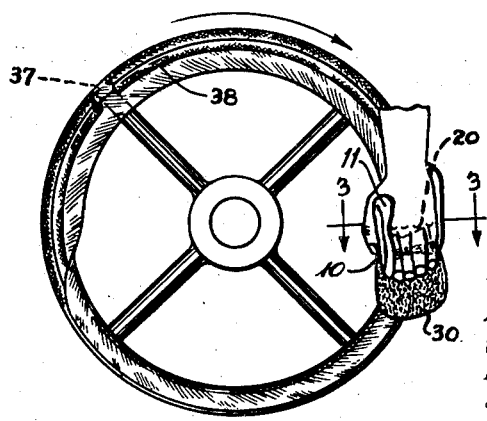
Fig. 2 is a side view of a tire building drum with a partially constructed tire thereon showing the tool in use.
Figure 4:
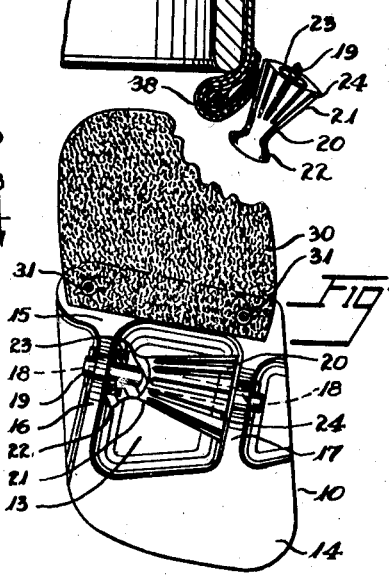
Fig. 4 is a plan view of the working face of the tool.

In use as a tool for forming the margins of rubberized fabric material in the building of a tire, plies 35, 36 of rubberized fabric are laid about the periphery of a tire building drum 37 and annular bead cores 38, 39 are placed thereon near the overhanging margins of the fabric. Then, with the drum in rotation, the tool held manually is placed with the pad parallel to the inner periphery of the laterally extending margins and in contact therewith. The margins of the fabric are thereby forced outwardly with the pad 30, moistened with gasoline, benzol, or other solvent of rubber-like material. The roller 20 is then brought into contact with the fabric, the drum being rotated all of the time in a direction away from the roller toward the pad, as indicated by the arrow in Fig. 2. As the drum rotates the tool is turned about the bead core folding the margins of the fabric thereabout until the roller is in the final position of Fig. 3. The flange 22 assists in the operation by hooking about the material on the bead core and holding the conical portion of the roller in the desired position while at the same time providing a wiping action across the fabric. The pad moistens the fabric and assists in smoothing it while the solvent not only acts as a lubricant but also aids adhesion.

The tools may be made both right and left handed so that an operator may manipulate the folding of fabric at either margin of the drum and may fold the fabric at both margins at once, the manipulation of the tool requiring merely a radius movement of the forearm with the arms held downwardly and substantially tangential to the drum, a position which naturally places the roller 20 at the most efficient angle.

By associating the pad directly with the roller, smoothing takes place before the solvent evaporates and rolling and applying solvent are substantially simultaneous and are accomplished with a single movement. As the drum makes a number of revolutions during the folding of the margins of the fabric, folding may take place progressively and the surface is constantly wetted with solvent during the rolling and smoothing thereof.

Variations may be made without departing from the scope of the invention as it is defined by the following claims.

I claim:

1. A tool for manipulating sheet material comprising a rubber composition, said tool comprising a support formed to fit the hand of the operator by contact of its back with the open palm of the hand, and a free-running roller mounted on the opposite face of said support, said roller having a conical rolling portion and a flange radial thereto at the smaller end thereof, and having its axis disposed oblique to the longitudinal axis of said support.

2. A tool for manipulating sheet material comprising rubber-like composition, said tool comprising a support adapted and arranged for support by the hand of an operator, a roller mounted upon said support for free-running movement over said material and means on said support for supplying a liquid to said material adjacent the face of said roller, said means being arranged to contact said sheet material directly.

3. A tool for manipulating sheet material comprising rubber-like composition, said tool comprising a support having a surface adapted to fit the open palm of an operator, a roller mounted upon said support for free-running movement over said material, and flexible means on said support adjacent the face of said roller for supplying a liquid to said material, said means being arranged to contact said sheet material directly.

4. A tool for manipulating sheet material comprising rubber-like composition, said tool comprising a support adapted to fit the open palm of an operator, a roller mounted upon said support for free-running movement over said material, and an absorbent pad of flexible material fixed to said support adjacent the face of said roller for supplying a liquid to said material.

5. A tool for manipulating sheet material comprising rubber-like composition, said tool comprising a support adapted to fit the open palm of an operator, a roller mounted upon said support for free-running movement over said material, said roller having a conical face and a radial flange adjacent the small end of said face, and an absorbent pad of flexible material fixed to said support adjacent the face of said roller for supplying a liquid to said material.

6. A tool for manipulating sheet material comprising rubber-like composition, said tool comprising a support adapted to fit the open palm of an operator, a roller mounted upon said support for free-running movement over said material, said roller having a conical face and a radial flange adjacent the small end of the face and having its axis disposed in a plane substantially parallel to the support at an inclination substantially equal to one half of the included angle of the conical portion thereof with relation to the longitudinal axis of the support such that the flange portion trails the large end of the conical portion in use, and means for supplying a liquid to the material adjacent the roller.

7. A tool for manipulating adhesive sheet material about rotating work, said tool comprising a support having a face generally complemental to the hand of an operator including a raised rib having concave side faces for reception in conforming relation between the thumb and forefinger of the operator's hand, and a free-running roller journaled at the opposite face of the support for engagement with the sheet material, said roller having an upstanding work-engaging flange.

FRANK S. STERNAD.

REFERENCES CITED

The following references are of record in the file of this patent:

UNITED STATES PATENTS

| Number | Name | Date |
| --- | --- | --- |
| 32,932 | Warner | July 30, 1861 |
| 205,627 | Fuller | July 2, 1878 |
| 285,256 | Greene | Sept. 18, 1883 |